INVENTOR
EMIL HOPNER

BY Robert E. Sandt

AGENT 3,293,376
Patented Dec. 20, 1966

3,293,376

COMMUNICATION SYSTEM UTILIZING FREQUENCY DIFFERENTIAL TIME DELAY

Emil Hopner, Yorktown Heights, N.Y., assignor to International Business Machines Corporation, New York, N.Y., a corporation of New York Filed Dec. 31, 1962, Ser. No. 248,698
4 Claims. (Cl. 179—100.2)

This invention relates to communication systems and more particularly to an improved system for overcoming impulse noise interference in narrow-band communication systems.

It is well known that impulse noises or line interruptions of even very short duration are the most troublesome interference encountered in data communication over wire lines.

In voice communication this form of interference is easily overcome by the inherent redundancy of the communication itself and by the ability of the human mind to transcend the interference. To preserve the integrity of transmitted coded data, many schemes have been employed. Redundancy in the coded message may be employed, with or without error correction, and the redundancy may be increased or decreased compatible with the incidence of noise in the communication medium. This redundancy, however, as the name connotes, must result in an overall diminuation in the number of data bits that can be transmitted in any given time period. A more attractive form of noise suppression is to operate upon the message in a predetermined linear fashion before the message is transmitted, and to perform the inverse of the same linear function at the receiver to reconstruct the message. Noise, when it occurs, will be subjected only to the inverse of the transformation at the receiver, and will, therefore, be separated from the data significant signals. The deleterious effect of noise upon the signal may, therefore, be minimized.

One technique proposed for applying a linear transformation to the message to be transmitted, and the inverse of that linear transformation to the received message at the receiver is the use of so-called smear and de-smear filters. These filters have the characteristic of applying a differential time delay to each different frequency component of the message. At the transmitter a smear filter is employed, which applies a delay which is a linear function of the frequency component, the higher frequency components having a longer delay. At the receiver, a de-smear filter having an opposite sloping time-delay function from the smear filter is employed to reconstruct the message signal. Noise on the transmission line is unaffected by the smear filter action, as it does not pass through this filter. The noise, however, does pass through the de-smear filter at the receiver and has its frequency components delayed by the filter. The noise will, therefore, be spread out at the receiver while the message is, in effect, being compressed. The noise energy, therefore, is spread out over an appreciable time period and the effective signal to noise ratio is effectively enhanced.

While the use of smear and de-smear filter pairs is theoretically attractive, the practical use thereof gives rise to some difficulties. One limitation in the use of filters is the limited time delay achievable by filters within the data signal bandwidth. The attainment of this delay through filters requires the use of many filter pairs, with the components accurately matched.

The instant invention employs the same principle of applying a different time delay to the various frequency components of the message at the receiver and reconstituting the message at the receiver by applying the inverse delay to the message frequency components and to the noise. However, it is toward the end of providing an improved apparatus capable of providing greater time delays that this invention is principally directed.

It is, therefore, an object of this invention to provide a transmission system having means at the transmitter for separating the component frequencies of a data message into a plurality of predetermined frequency ranges, for applying a given time delay to each of the separated frequency components, for transmitting the thus delayed component frequencies, and means at the receiver for applying an inverse delay to the respective component frequencies, and for reconstituting the message.

A further object of this invention is to employ a moving magnetic recording and reproducing device at the transmitter in a communication system to delay transmission of each of the component frequencies of a message signal by a different fixed amount, and an inversely operating magnetic recording and reproducing device at the receiver to recombine the delayed signals.

The foregoing and other objects, features and advantages of the invention will be apparent from the following more particular description of a preferred embodiment of the invention, as illustrated in the accompanying drawings.

Figure 1:
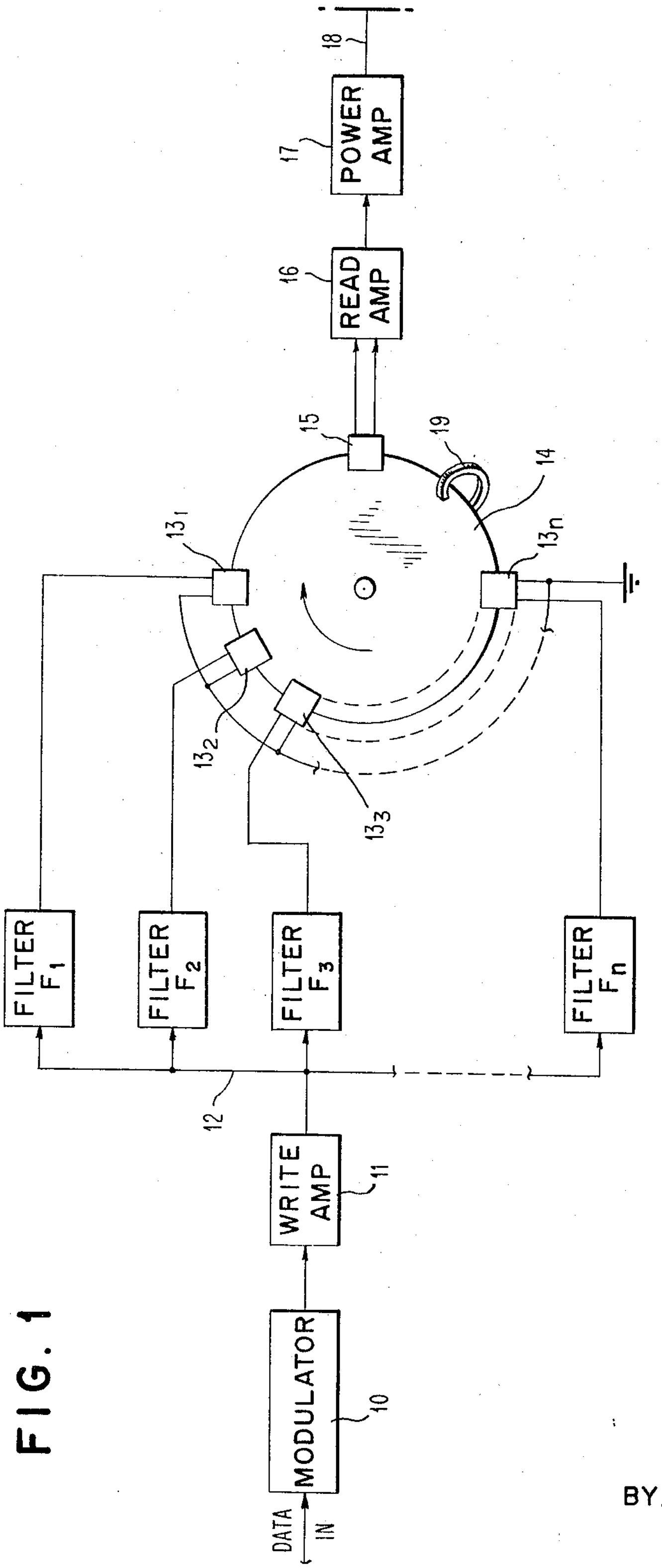
FIG. 1 is a schematic showing of the apparatus associated with the message transmitter.
Figure 2:
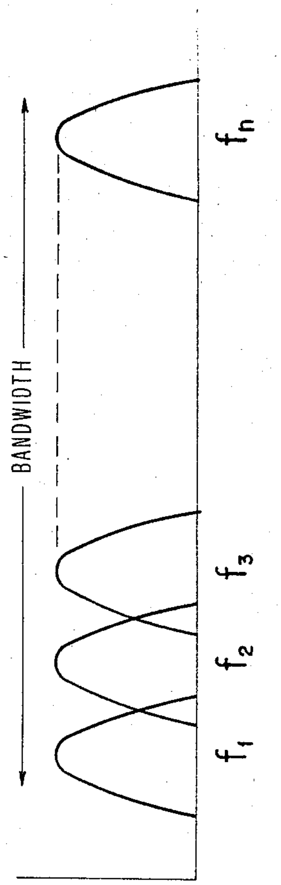
FIG. 2 is a graphical representation of the frequency response of the filters employed in the apparatus.

In FIG. 1 the apparatus at the transmitter for applying the predetermined time delays to each respective band of frequencies constituting the message is shown. The modulator 10 receives the data and produces the conventional signals that would normally be transmitted over the transmission line. These signals may include redundancy information, although the need for such is considerably reduced by use of the instant invention. The output signals from the modulator 10, containing all of the component frequencies within the bandwidth of the transmission medium, and some beyond, are amplified in a write amplifier 11 having a linear frequency response at least equal to the bandwidth of the transmission medium. The output of the write amplifier 11 is connected in parallel to all of the filters $F_1$ to $F_n$ through the common line, the break in the line connoting that filters in excess of the four illustrated will obviously be employed. Each of the filters F is a band-pass filter operative to pass a different narrow band of frequencies and to attenuate frequencies outside the band. The frequency response of these filters will overlap somewhat as shown in FIG. 2. Connected to each filter F is a respective write head $\mathbf{13}_1$ to $\mathbf{13}_n$, these heads being matched to and part of the filters and enhance in the filter action. The heads 13 are in writing coaction with the surface of a magnetic drum 14 which is rotated by a carefully speed-regulated motor to run at constant angular velocity. Each of the heads 13 bears a different fixed angular relationship with respect to a read head 15, so that the signals recorded on the drum surface by each of the respective heads $\mathbf{13}_1$ to $\mathbf{13}_n$ will arrive at the read head 15 at a different predetermined but predictable time. The filters may be connected in the hierarchal order of their frequency responses, as shown, or in any other predetermined order. The read amplifier 16 receives the signals from the head 15, amplifies them, and passes them to a power amplifier 17, for transmission on the transmission line 18. A conventional erase magnet 19 destroys the signals on the drum 14 after they are read by the head 15.

Exemplary parameters of an apparatus for use in a transmission system having a 3 kc. bandwidth include ten filters F, ten recording heads 13, and a drum of eight inches diameter revolving at 200 r.p.m. to yield a time delay of the maximum delayed signal of 100 milliseconds and proportionately smaller delays for the less delayed signals.

Figure 3:
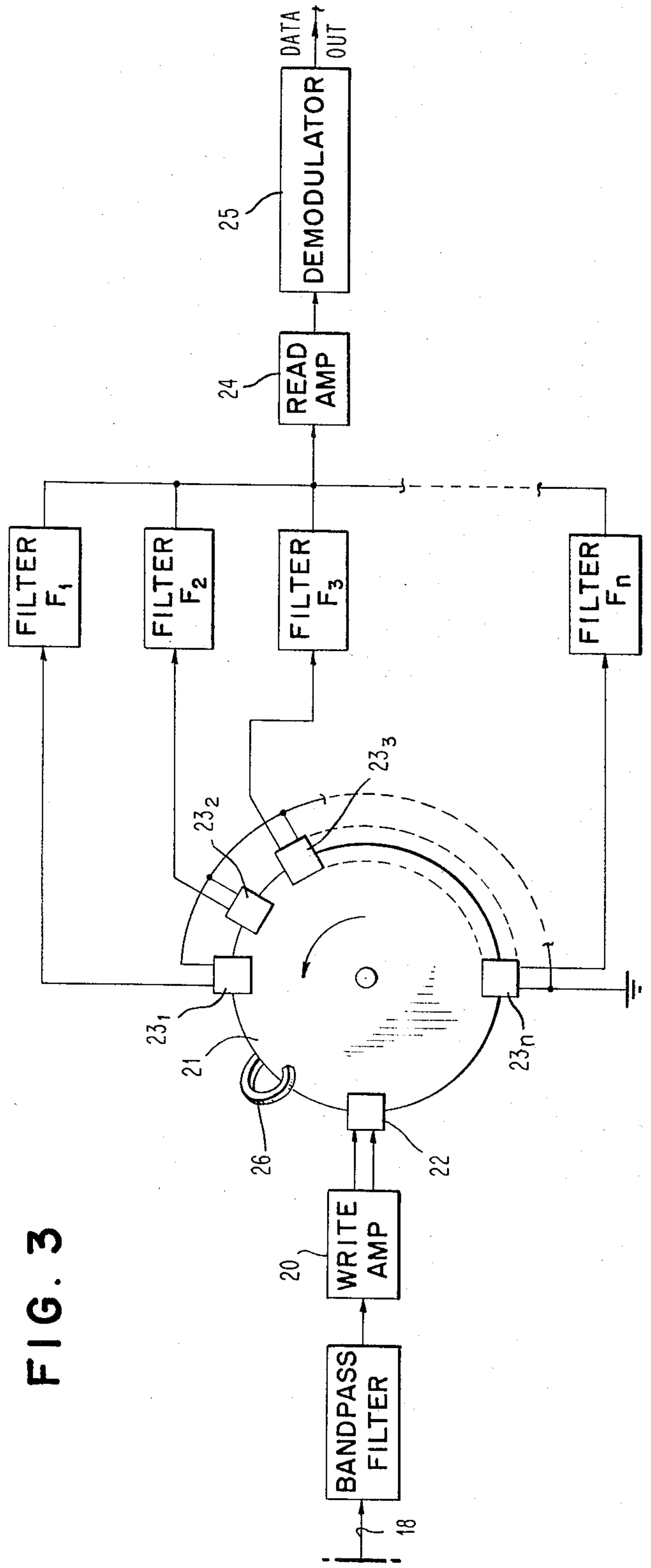
FIG. 3 is a schematic showing the apparatus associated with the message receiver.

The receiver in FIG. 3 performs the inverse time delay functions to reconstitute the message. The delayed signal components and any noise are received on the line 18, amplified in amplifier 20 and written on the drum 21 by the write head 22. Although all of the signals thus written serially will pass the read heads $23_n$, $23_3$, $23_2$, and $23_1$, in succession and will induce a signal in their respective windings, only the signals of the requisite frequency will be passed by the filters $F_1$ to $F_n$ which are identical to the filters in FIG. 1. These filters pass only the signals to which the respective filters are tuned, these signals being mixed in the read amplifier 24, and demodulated in the demodulator 25 to produce the decoded signal in the form in which it was originally entered in the modulator 10 of the transmitter. An erase head 26 just prior to the write head 22 erases the signal recorded on each revolution of the drum 21.

It is apparent that if the drum 21 rotates synchronously with the drum 14 at the transmitter, and each of the heads $23_1$, $23_2$, $23_3$, and $23_n$ has a respective angular relationship relative to the write head 22 inversely related to the respective angular relationships of the heads $13_1$, $13_2$, $13_3$, and $13_n$ to the head 15, that the signals recorded in parallel by the respective heads $13_1$, $13_2$, $13_3$, and $13_n$ at any instant of time will be read in parallel by the respective heads $23_1$, $23_2$, $23_3$, and $23_n$ at another instant of time, delayed from the first instant by a fixed delay. For the sake of example, let it be assumed that the spacing of the heads 13 is one time unit apart, and the spacing from the head 15, to $13_1$ is three time units. Then at the instant of time zero each of the heads 13 will record its respective frequency response in parallel. At time period three (T.P. 3), the head 15 will read that written at time zero by the head $13_1$. At T.P. 4 head 15 reads the $13_2$ record at T.P.5 the $13_3$ record and at T.P. $n+3$, the record of head $13_n$. Assuming an inverse head relationship in the receiver, the head 22 will record $F_1$ at T.P. 3, $F_2$ at T.P. 4, $F_3$ at T.P. 5, and $F_n$ at T.P. $n+3$. At T.P. 6, $F_1$ will be opposite the head $23_n$ but will produce no output response in the filter $F_n$. It will only be at time T.P. $n+6$ that each of the serially recorded signals on the drum 21 will be beneath a head whose filter is receptive to the signal frequency to pass the signal. Since the $F_1$ signal was initially delayed by three time uniits at the transmitter and $n+3$ additional at the receiver, it will be demodulated at T.P. $n+6$ along with all other signals in parallel.

Expressed in another manner, if the distance separating any one of the heads 13 from the head 15 is defined as "*a*," and the distance separating head 22 from a corresponding head 23 is defined as "*b*," then $a+b$ must equal a constant. Since the drum speeds are synchronous, the distances "*a*" and "*b*" are directly proportional to time. Corresponding heads in the subscripted series 13 and 23 are heads connected to like-responding filters. In FIG. 1 the distances are measured clockwise, while in FIG. 3 the distances are measured counterclockwise, consistent with the respective directions of rotation of the magnetic record media.

Any noise signal, however, will be recorded by the head 22. Assuming the noise contains all of the frequency components equally distributed, then the noise at any one instant will be spread over $n+3$ time units by the filter action at the receiver. The instantaneous energy of the noise will, therefore, be dissipated in $n+3$ time units so as to reduce its instantaneous amplitude at any instant during that period to a negligible minimum. Since noise is essentially of short duration, any instantaneous noise pulse will, therefore, not blank out a data pulse as it might without the spreading of the noise over an extended time period. The greater the time period over which the noise is spread, the less will be the instantaneous amplitude thereof.

With the use of a magnetic recording device as a variable delay, not only can the delay period be materially increased, but also the inverse transforms can be controlled more accurately. The rotational speeds of the two drums can be maintained constant within close limits by known technological expedients. The separate ones of the filter pairs are identical and can be easily matched. The angular relationships of the magnetic heads can easily be adjusted to effect the same delays. Thus, a simple and effective means for performing the transform of the transmitted signal at the transmitter, and the inverse transform upon the received signal at the receiver has been devised.

While the invention has been particularly shown and described with reference to a preferred embodiment thereof, it will be understood by those skilled in the art that various changes in form and details may be made therein without departing from the spirit and scope of the invention.

What is claimed is:

1. In a communication system having a transmitter and a receiver operatively connected by a communication link, apparatus for operating upon the message signal at the transmitter according to a first transform to derive a transmitted signal, and apparatus for operating upon the transmitted signal at the receiver according to a second transform which is the inverse of said first transform to re-establish the message signal comprising:

(a) a signal storage medium associated with said transmitter and continuously movable at a uniform velocity along a fixed path serially past a succession of signal recording instrumentalities and a signal sensing instrumentality;

(b) a plurality of filters commonly connected and receptive of the message bearing signal at said transmitter, and individually connected to respective ones of said signal recording instrumentalities, each of said filters being so constructed as to pass signals within a different predetermined frequency range, whereby each of said recording instrumentalities will record signals having a different frequency range in accordance with the filter connected thereto;

(c) a signal storage medium associated with said receiver and continuously movable at a uniform velocity along a fixed path seriately past a signal recording instrumentality and a succession of signal sensing instrumentalities;

(d) means operatively connecting the signal sensing instrumentality at said transmitter and the signal recording instrumentality at said receiver;

(e) a plurality of filters at said receiver each individually connected to a respective one of said signal sensing instrumentalities and commonly connected to produce a composite signal output of the individual outputs of said filters, each of said filters having a frequency response substantially identical to that of a corresponding filter in said transmitter;

(f) the instrumentalities at said transmitter and said receiver being so relatively disposed that the sums of the distances "*a*" and "*b*" are constant for all pairs of corresponding instrumentalities, the distance "*a*" being the distance separating any given one of the recording instrumentalities from the sensing instrumentality at the transmitter measured in the direction of movement of said storage medium, the distance "*b*" being the distance separating the recording instrumentality at said receiver from any given one of the sensing instrumentalities measured in the direction of movement of said storage medium, and corresponding pairs of instrumentalities consisting of an instrumentality at the transmitter and one at the receiver each connected to like filters.

2. In a communication system having a transmitter and a receiver operatively connected by a communication link, apparatus for operating upon the message signal at the transmitter according to a first transform to derive a transmitted signal, and apparatus for operating upon the transmitted signal at the receiver according to a second transform which is the inverse of said first transform to re-establish the message signal comprising:

(a) a magnetic record medium associated with said transmitter and continuously movable at a uniform velocity along a fixed path seriately past a succession of magnetic recording heads and a magnetic sensing head;

(b) a plurality of filters commonly connected and receptive of the message bearing signal at said transmitter, and individually connected to respective ones of said magnetic recording heads, each of said filters being so constructed as to pass signals within a different predetermined frequency range, whereby each of said recording heads will record signals having a different frequency range in accordance with the filter connected thereto;

(c) a magnetic record medium associated with said receiver and continuously movable at a uniform velocity along a fixed path seriately past a magnetic recording head and a succession of magnetic sensing heads;

(d) means operatively connecting the magnetic sensing head at said transmitter and the magnetic recording head at said receiver;

(e) a plurality of filters at said receiver each individually connected to a respective one of said magnetic sensing heads and commonly connected to produce a composite signal output of the individual outputs of said filters, each of said filters having a frequency response substantially identical to that of a corresponding filter in said transmitter;

(f) the heads at said transmitter and said receiver being so relatively disposed that the sums of the distances "*a*" and "*b*" are constant for all pairs of corresponding heads, the distance "*a*" being the distance separating any given one of the recording heads from the sensing instrumentality at the transmitter, the distance "*b*" being the distance separating the recording head at said receiver from any given one of the sensing heads, the distances "*a*" and "*b*" being measured in the direction of movement of the respective magnetic record media, and corresponding pairs of heads consisting of a recording head at the transmitter and a sensing head at the receiver each connected to like filters.

3. In a communication system having a transmitter and a receiver operatively connected by a communication link, apparatus for operating upon the message signal at the transmitter according to a first transform to derive a transmitted signal, and apparatus for operating upon the transmitted signal at the receiver according to a second transform which is the inverse of said first transform to re-establish the message signal comprising:

(a) a moving magnetic recording and reproducing device at said transmitter, having N recording heads and a single reproducing head, all coactively engaging a single track of the uniformly moving storage medium at spaced locations along the track;

(b) a filter connecting each of said recording heads with the message signal, each filter being adapted to pass signals only within a different predetermined frequency range;

(c) a moving magnetic recording and reproducing device at said receiver having a single recording head, operatively connected to said reproducing head at said transmitter, and N reproducing heads, respectively corresponding to the N recording heads at said transmitter, all coactively engaging a single track of the uniformly moving storage medium at spaced locations along the track;

(d) a filter connected to each of said reproducing heads and having their outputs commonly connected, each filter connected to a corresponding head of both said recording and reproducing devices having a similar frequency response;

(e) the spatial relatinship of the heads in said recording and reproducing devices being so arranged that the sum of the distance separating each respective one of said N recording heads from the single reproducing head, and the distance separating the single recording head from each respective corresponding one of said N reproducing heads is a constant, the distances being measured in the direction of movement of the moving magnetic recording and reproducing device.

4. In a communication system:

(a) means for generating a message signal modulated to include all frequencies within the bandwidth of the system;

(b) a plurality of bandpass filters connected to said signal generating means, each operative to pass only those component portions of said message signal having a frequency range within a predetermined different frequency band;

(c) a magnetic storage medium moved with uniform velocity along a fixed path;

(d) a plurality of magnetic recording heads connected one each to each of said filters and coactively engaging said medium at a different predetermined location along the path of movement of said medium to record the component portions passed by each of said filters at the respective locations in the common track of said medium;

(e) a magnetic reading head coactively engaging said medium to serially read the signals recorded in said medium by said plurality of recording heads;

(f) a transmission line connected to said reading head;

(g) a magnetic storage medium at said receiver moved with uniform velocity along a fixed path;

(h) a magnetic recording head connected to said transmission line, and coactively engaged with said moving storage medium at the receiver to produce a record in said medium duplicate to the record read by said read head in transmitter;

(i) a plurality of magnetic read heads coactively engaging the storage medium at said receiver and spaced along the path of movement thereof with the same respective spatial relationships to the recording head as the plurality of recording heads in the transmitter associated apparatus occupy with respect to the reading head thereat, and operative to respond to the recorded signals in said medium, (j) and a plurality of filters each having a response characteristic like that of a corresponding filter at the transmitting end of the system, and each so connected to one of said plurality of read heads that simultaneously recorded component signals at said transmitter will be simultaneously passed by the appropriately connected filters at the receiving end of the transmission system.

References Cited by the Examiner

UNITED STATES PATENTS 2,941,035 6/1960 Honolka --------- 179—100.2

BERNARD KONICK, *Primary Examiner.*

A. I. NEUSTADT, *Assistant Examiner.*